(12) United States Patent
Sakamaki et al.

(10) Patent No.: US 7,298,109 B2
(45) Date of Patent: Nov. 20, 2007

(54) ELECTRIC POWER STEERING APPARATUS, AND METHOD FOR DETECTING ABNORMALITY OF ANGLE DETECTOR THEREOF

(75) Inventors: Masahiko Sakamaki, Okazaki (JP); Shigeki Nagase, Nabari (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 11/421,555

(22) Filed: Jun. 1, 2006

(65) Prior Publication Data

US 2006/0273247 A1 Dec. 7, 2006

(30) Foreign Application Priority Data

Jun. 2, 2005 (JP) ............................ 2005-163297

(51) Int. Cl.
*B62D 5/04* (2006.01)
(52) U.S. Cl. .................. 318/489; 318/254; 318/605
(58) Field of Classification Search ................ 318/138, 318/254, 439, 488–489, 604–605, 661, 720–724; 180/6.28, 443–446
See application file for complete search history.

(56) References Cited

U.S. PATENT DOCUMENTS

| | | | | |
|---|---|---|---|---|
| 6,679,350 B2 * | 1/2004 | Shimizu et al. | ............. | 180/446 |
| 6,810,986 B2 * | 11/2004 | Takagi | ..................... | 180/446 |
| 7,154,404 B2 * | 12/2006 | Sato | ......................... | 340/648 |
| 7,161,317 B2 * | 1/2007 | Matsushita et al. | ......... | 318/432 |
| 7,187,153 B2 * | 3/2007 | Imagawa et al. | ........... | 318/638 |

FOREIGN PATENT DOCUMENTS

| | | |
|---|---|---|
| JP | 10-197238 A | 7/1998 |
| JP | 10-258757 A | 9/1998 |
| JP | 10-278826 A | 10/1998 |
| JP | 2002-081961 A | 3/2002 |

* cited by examiner

*Primary Examiner*—Bentsu Ro
(74) *Attorney, Agent, or Firm*—Darby & Darby P.C.

(57) ABSTRACT

An electric power steering apparatus which comprises: an angle detector for outputting a sine wave signal and a cosine wave signal corresponding to a rotor position of a brushless DC motor; and a torque detector for detecting a steering torque applied to a steering member, and which drives the brushless DC motor to assist steering based upon the sine wave signal and the cosine wave signal which were outputted from the angle detector and the steering torque detected by the torque detector. A sine wave signal and a cosine wave signal are squared and added to each other, and whether or not abnormality has occurred in the angle detector is detected by whether the addition result falls within a predetermined range. It is possible to detect abnormality in the angle detector at an early stage.

12 Claims, 8 Drawing Sheets

F I G. 6A
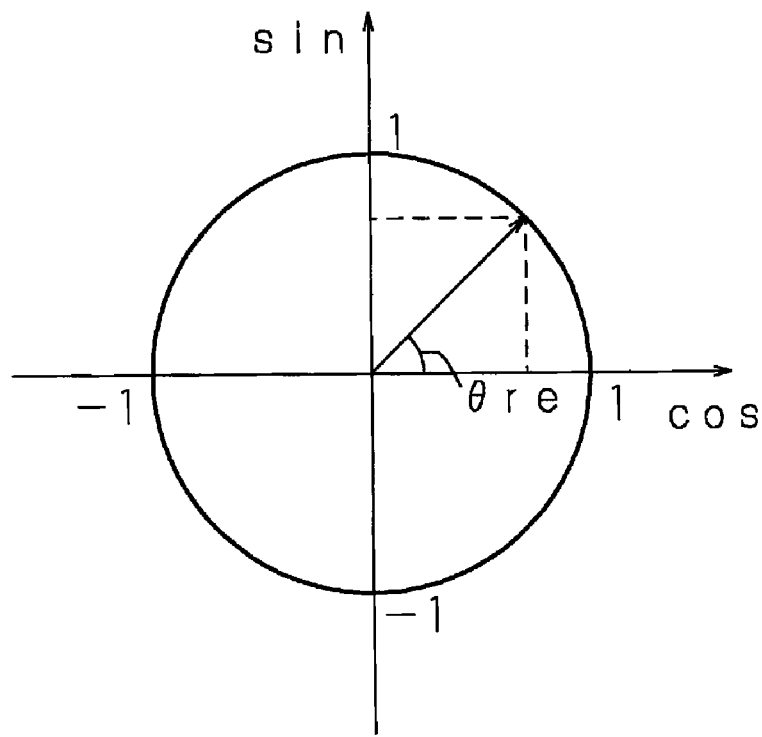
F I G. 6B
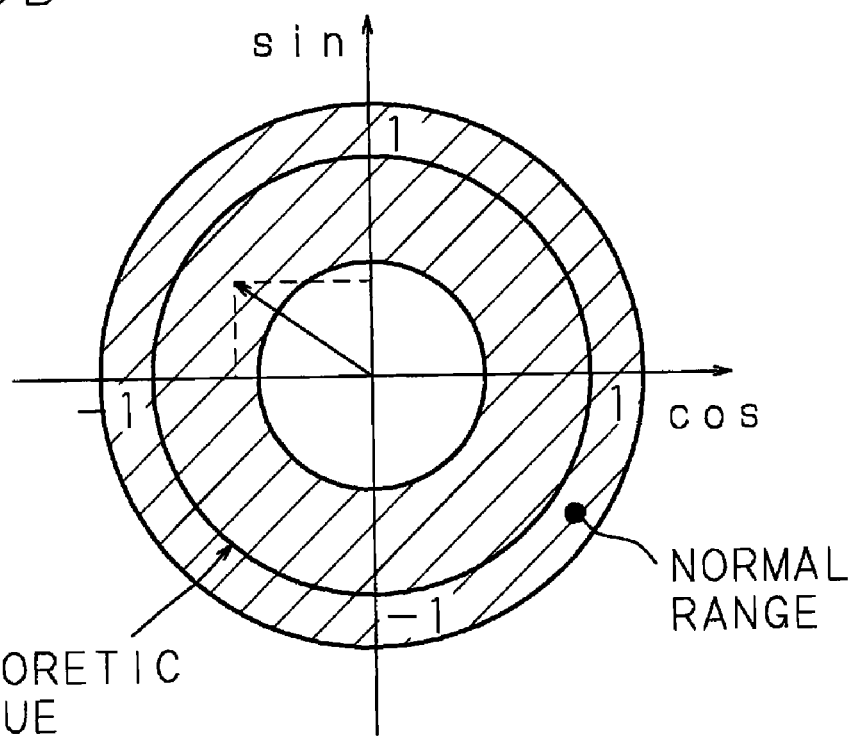

ELECTRIC POWER STEERING APPARATUS, AND METHOD FOR DETECTING ABNORMALITY OF ANGLE DETECTOR THEREOF

CROSS-REFERENCE TO RELATED APPLICATIONS

This Nonprovisional application claims priority under 35 U.S.C §119(a) on Patent Application No. 2005-163297 filed in Japan on Jun. 2, 2005, the entire contents of which are hereby incorporated by reference.

BACKGROUND OF THE INVENTION

1. Field of the Invention

The present invention relates to an electric power steering apparatus using a brushless DC motor for steering assistance. More specifically, the present invention relates to the electric power steering apparatus which comprises an angle detector (angle sensor) for outputting a sine wave signal and a cosine wave signal which correspond to a rotor position of a brushless DC motor and a torque detector for detecting a steering torque applied to a steering member, and drives the brushless DC motor, based upon the sine wave signal and the cosine wave signal which were outputted from the angle detector and the steering torque detected by the torque detector, to assist steering. Further, the present invention relates to a method for detecting abnormality of an angle detector for use in such electric power steering apparatus.

2. Description of Related Art

An electric power steering apparatus, which drives an electric motor for assisting steering so as to alleviate the load of a driver, typically comprises: an input shaft connected to a steering member (steering wheel); an output shaft connected to steering control wheels through a pinion, rack and the like; and a connecting shaft for connecting the input shaft and the output shaft. A steering torque value to be applied to the input shaft is detected by a torque sensor based upon an angle of distortion generated in the connecting shaft, and the electric motor for steering assistance, which is coupled with the output shaft, is driven and controlled.

In recent years, a brushless DC motor has been in use in such an electric power steering apparatus as described above. In the brushless DC motor of the electric power steering apparatus, a current flowing through a stator is PWM (pulse width modulation) controlled such that a rotary magnetic field generates according to a rotating position of a rotor. For detecting the rotor position, an angle sensor (angle detector) such as a resolver or an MR sensor for outputting a sine wave signal and a cosine wave signal is used.

Incidentally, when the angle sensor (angle detector) used for detecting the rotor position is broken down and thereby an accurate data of the rotating position cannot be obtained, it is not possible to allow an appropriate current according to the rotor position to flow through the brushless DC motor. In such case, therefore, a steering wheel (steering member) might vibrate or be locked in the electric power steering apparatus using the brushless DC motor. In such circumstances, the following inventions have been proposed with the aim of detecting abnormality in the brushless DC motor, more specifically, in the angle sensor (angle detector).

Japanese Patent Application Laid-Open No. 2002-81961 discloses an invention in which an analog signal of a magnetic detection element is converted to a digital signal, and according to a difference value between the digital signal and a resolver signal, abnormality in an angle sensor is detected.

Japanese Patent Application Laid-Open No. 10-278826 (1998) discloses an invention in which a steering angle given from an angle sensor at a predetermined cycle is stored, a derivation value of the steering angle is calculated, an absolute value of a difference from a previous derivation value is obtained, and the obtained absolute value is compared with a threshold, to detect abnormality.

Japanese Patent Application Laid-Open No. 10-258757 (1998) discloses an invention in which a difference between two optional outputs among outputs of three respective steering angle sensors is obtained and it is determined that an abnormal sensor is included in a combination of the two sensors whose output difference is a value apart from zero.

Japanese Patent Application Laid-Open No. 10-197238 (1998) discloses an invention in which a predetermined number of samplings of a steering angle having been detected by a steering angle sensor are performed within a predetermined period of time to calculate an average and a derivation, and when the average or the derivation falls out of a predetermined range, the sensor is determined as abnormal.

However, there has been a problem in that abnormality in a detector cannot be detected at an early stage in the case of the above-mentioned prior arts.

BRIEF SUMMARY OF THE INVENTION

The present invention was made in view of the foregoing circumstances. It is a primary object of the present invention to provide an electric power steering apparatus, when a brushless DC motor as an electric motor for steering assistance is used, capable of detecting abnormality in a detector (angle detector) for detecting a rotor position of the brushless DC motor at an early stage, and to provide a method for detecting abnormality of an angle detector.

A first aspect of the electric power steering apparatus according to the present invention is an electric power steering apparatus which comprises: an angle detector for outputting a sine wave signal and a cosine wave signal corresponding to a rotor position of a brushless DC motor for assisting steering; a torque detector for detecting a steering torque applied to a steering member; and an abnormality detecting unit for detecting occurrence of abnormality in the angle detector; and which drives the brushless DC motor to assist steering based upon the sine wave signal and the cosine wave signal outputted from the angle detector and the steering torque detected by the torque detector, and is characterized in that the abnormality detecting unit includes: sine wave signal squaring means for squaring the sine wave signal detected by the angle detector; cosine wave signal squaring means for squaring the cosine wave signal detected by the angle detector; adding means for adding the sine wave signal squared by the sine wave signal squaring means to the cosine wave signal squared by the cosine wave signal squaring means; judging means for judging whether or not the addition result by the adding means falls within a predetermined range; and abnormality detecting means for detecting occurrence of abnormality in the angle detector when the judging means judges that the addition result does not fall within the predetermined range.

Further, a first aspect of a method according to the present invention is a method for detecting abnormality of an angle detector of an electric power steering apparatus, and the electric power steering apparatus comprises: an angle detector for outputting a sine wave signal and a cosine wave signal corresponding to a rotor position of a brushless DC motor for assisting steering; a torque detector for detecting a steering torque applied to a steering member; and an abnormality detecting unit for detecting occurrence of abnormality in the angle detector; and drives the brushless DC motor to assist steering based upon the sine wave signal and the cosine wave signal outputted from the angle detector and the steering torque detected by the torque detector, and is characterized by comprising the steps of making the abnormality detecting unit square the sine wave signal outputted by the angle detector; making the abnormality detecting unit square the cosine wave signal outputted by the angle detector; making the abnormality detecting unit add the squared sine wave signal to the squared cosine wave signal; making the abnormality detecting unit judge whether or not the addition result falls within a predetermined range; and making the abnormality detecting unit determine that abnormality occurs in the angle detector when the addition result does not fall within the predetermined range.

A second aspect of the electric power steering apparatus according to the present invention is based on the first aspect of the same, and is characterized in that the upper limit of the predetermined range is determined based upon respective error ranges of the sine wave signal and the cosine wave signal.

Further, a second aspect of the method according to the present invention is based on the first aspect of the same, and is characterized in that the upper limit of the predetermined range is determined based upon respective error ranges of the sine wave signal and the cosine wave signal.

A third aspect of the electric power steering apparatus according to the present invention is base on the first or second aspect, and is characterized by further comprising: sine wave offset correcting means for correcting an offset of the sine wave signal detected by the angle detector with respect to a neutral point; cosine wave offset correcting means for correcting an offset of the cosine wave signal detected by the angle detector with respect to a neutral point; sine wave amplitude correcting means for correcting an amplitude value of the sine wave signal detected by the angle detector; and cosine wave amplitude correcting means for correcting an amplitude value of the cosine wave signal detected by the angle detector; wherein a lower limit of the predetermined range is determined based upon the minimum value out of addition results obtained by the adding means within a range where the sine wave signal and the cosine wave signal are correctable by both of the offset correcting means and both of the amplitude correcting means.

Further, a third aspect of the method according to the present invention is based on the first or second aspect of the same, and is characterized in that the power steering apparatus further comprising a rotor position detecting unit for detecting a rotor position of the brushless DC motor based on the sine wave signal and the cosine wave signal outputted by the angle detector, and the method further comprising the steps of making the rotor position detecting unit correct an offset of the sine wave signal outputted by the angle detector with respect to a neutral point; making the rotor position detecting unit correct an offset of the cosine wave signal outputted by the angle detector with respect to a neutral point; making the rotor position detecting unit correct an amplitude value of the sine wave signal; and making the rotor position detecting unit correct an amplitude value of the cosine wave signal; wherein a lower limit of the predetermined range is determined based upon the minimum value out of addition results obtained by the adding step within a range where the sine wave signal and the cosine wave signal are correctable by both of the offset correcting step and both of the amplitude correcting step.

In the electric power steering apparatus and the method for detecting abnormality of the angle detector thereof according to the present invention as thus described, a sine wave signal and a cosine wave signal outputted from an angle detector according to the rotor position of the brushless DC motor are squared respectively. The squared sine wave signal is added to the squared cosine wave signal, and when the addition result does not fall within a predetermined range, occurrence of abnormality in the angle detector is detected.

Accordingly, the electric power steering apparatus is realized which is capable of detecting, at an early stage, abnormality in the detector (angle detector) of the rotor position of the brushless DC motor for steering assistance in the case of occurrence of the abnormality.

The above and further objects and features of the invention will more fully be apparent from the following detailed description with accompanying drawings.

BRIEF DESCRIPTION OF THE SEVERAL VIEWS OF THE DRAWINGS

FIG. 6A and FIG. 6B are explanatory views for explaining an operation of detecting abnormality in the resolver (angle detector) of the electric power steering apparatus according to the present invention.

DETAILED DESCRIPTION OF THE PRESENT INVENTION

In the following, the present invention is described based upon drawings showing embodiments thereof.

Figure 1:
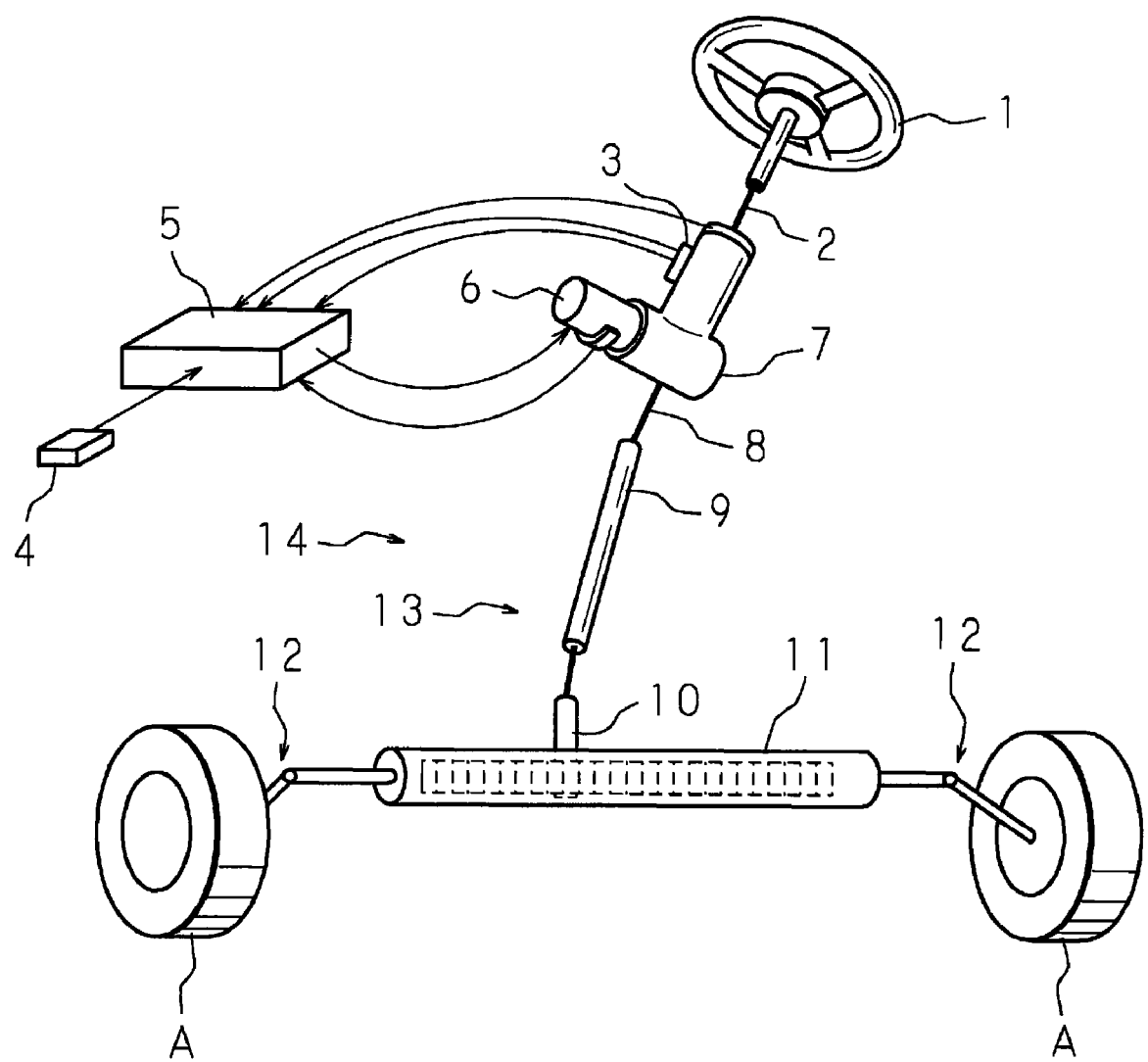
FIG. 1 is a schematic view showing a mechanical configuration of an embodiment of an electric power steering apparatus according to the present invention.

FIG. 1 is a schematic view showing a mechanical configuration of an embodiment of an electric power steering apparatus according to the present invention. The electric power steering apparatus according to the present invention is provided with: a steering wheel (steering member) 1 for steering; a brushless DC motor (hereinafter simply referred to as motor) 6 for steering assistance which is driven according to steering of the steering wheel 1; transmitting means 13 for transmitting rotation of the motor 6 to steering mechanisms 12, 12 through a reduction gear mechanism 7; and an ECU (electronic control unit) 5 for driving and controlling the motor 6. To the ECU 5, a vehicle speed signal outputted from a vehicle speed sensor 4 for detecting a traveling speed of the vehicle is given.

The transmitting means 13 comprises: an output shaft 8 connected to an input shaft 2 connected to the steering wheel 1 through a torsion bar (not shown); a connecting shaft 9 connected to the output shaft 8 through a universal joint; a pinion shaft 10 connected to the connecting shaft 9 through a universal joint; and a rack shaft 11 having rack teeth meshed with a pinion of the pinion shaft 10, connected to right and left steering control wheels A, A through the steering mechanisms 12, 12, and the like. The input shaft 2 and the transmitting means 13 constitute a steering shaft 14.

Around the input shaft 2 arranged is a torque sensor 3 for detecting a steering torque, which is applied to the input shaft 2 by operation of the steering wheel 1, according to distortion generated in the torsion bar. Based upon the steering torque detected by the torque sensor 3, the ECU 5 drives and controls the motor 6.

The reduction gear mechanism 7 comprises a worm connected to the output shaft of the motor 6, a worm wheel fitted in the middle of the output shaft 8, and the like. The rotation of the motor 6 is transmitted to the output shaft 8 through the worm and the worm wheel.

In the electric power steering apparatus with the configuration as described above, steering operating force generated by operation of the steering wheel 1 is transmitted to the rack shaft 11 through the input shaft 2, the torsion bar (not shown), the output shaft 8, the connecting shaft 9 and the pinion shaft 10. As a result, the rack shaft 11 moves in the direction of the length thereof, leading to operation of the steering mechanisms 12, 12. Further, simultaneously with this, the ECU 5 drives and controls the motor 6 based upon the steering torque detected by the torque sensor 3 so that driving force of the motor 6 is transmitted to the output shaft 8. Thereby, the steering operating force is assisted to alleviate load of a driver for steering.

Figure 2A:
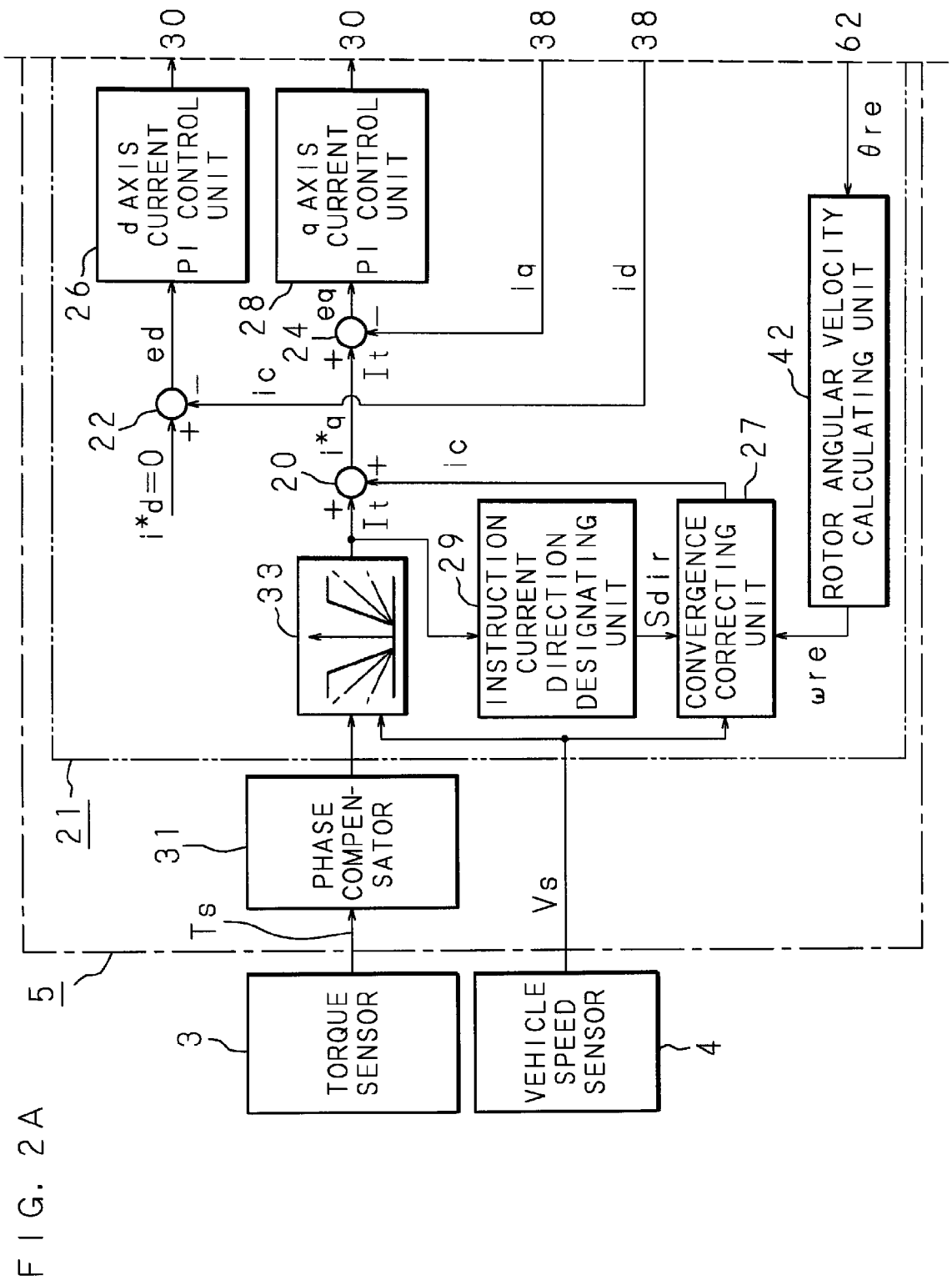
FIG. 2A and FIG. 2B are block diagrams showing a configuration example of a control system of the electric power steering apparatus according to the present invention.
Figure 2B:
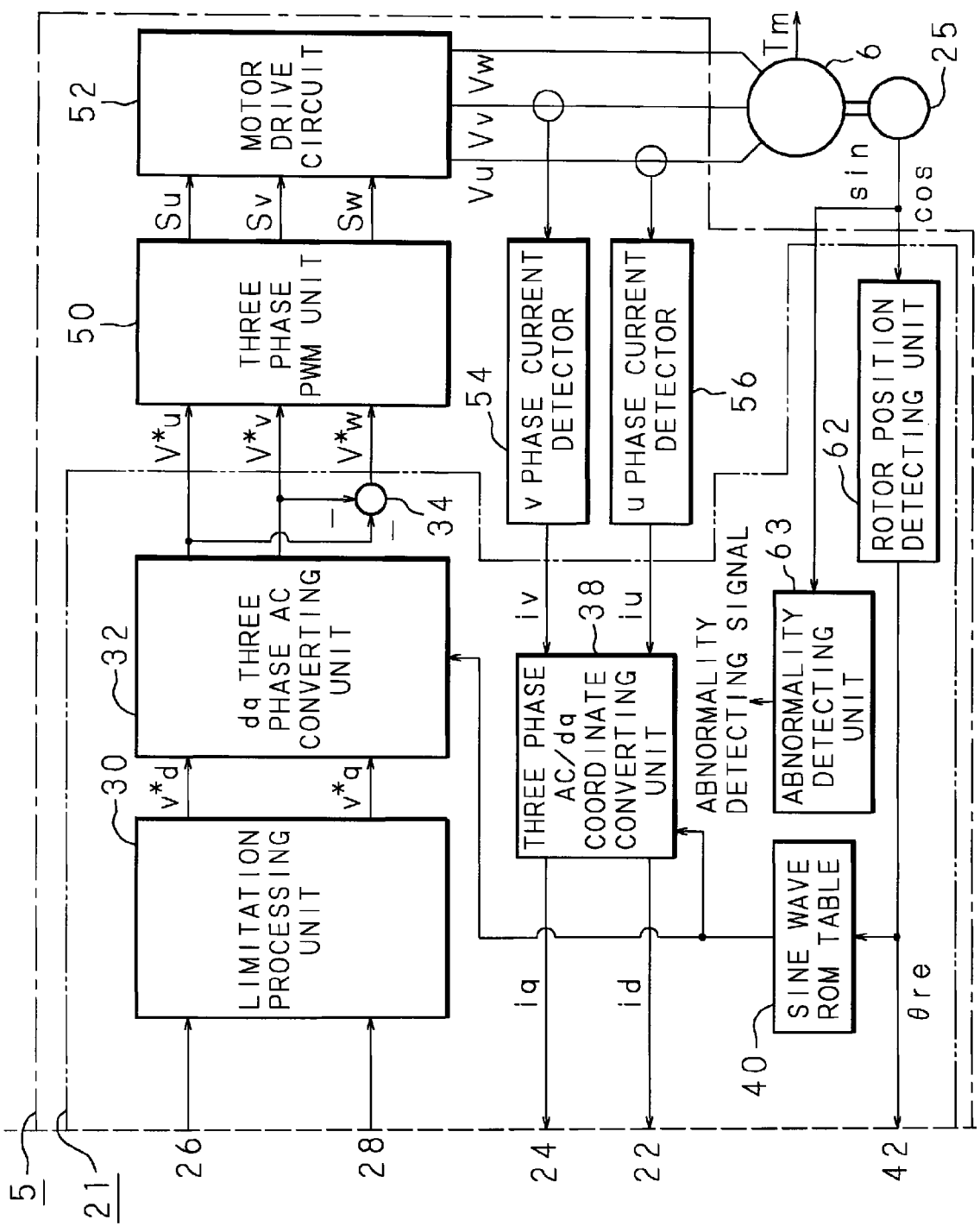

FIG. 2A and FIG. 2B are block diagrams which show a control system of the electric power steering apparatus according to the present invention, specifically a configuration example of the inside of the ECU 5. Note that FIG. 2A and FIG. 2B are originally one block diagram which is divided into a left half portion as FIG. 2A and a right half portion as FIG. 2B.

The ECU 5 comprises: a microcomputer 21 as a control center; a phase compensator 31 to which a steering torque value Ts detected by the torque sensor 3 is given; a rotor position detecting unit 62 to which a sine wave signal and a cosine wave signal outputted from a later described resolver 25 are given; a v-phase current detector 54 and a u-phase current detector 56 for respectively detecting current values iv and iu flowing through a v-phase field coil and a u-phase field coil of the motor 6; a three phase PWM unit 50 which performs pulse width modulation of respective voltage instruction values V*u, V*v and V*w of three phases given from the microcomputer 21, and gives the obtained values as PWM signals Su, Sv and Sw of the three phases to a motor drive circuit 52, and the like.

The steering torque value Ts detected by the torque sensor 3 is given to the phase compensator 31, and the steering torque value which is phase-compensated by the phase compensator 31 is given to a torque-current table 33. Further, a vehicle speed value Vs detected by the vehicle speed sensor 4 is given to the torque-current table 33 and an convergence correcting unit 27.

In the torque-current table 33, a function is variably set according to the vehicle speed value Vs. The function set in the torque-current table 33 is a function such that a target value It of the motor current increases proportionally according to an increase in steering torque value when the steering torque value exceeds a predetermined dead zone, and the target value It of the motor current saturates when the steering torque value becomes or exceeds a predetermined value. Also, the function set in the torque-current table 33 is such that, as the vehicle speed value Vs becomes larger, a ratio of the target value It of the motor current with respect to the steering torque value becomes smaller and a saturation value of the target value It becomes smaller. The target value It of the motor current determined by the function set in the torque-current table 33 is given to adding means 20 and an instruction current direction designating unit 29.

The target value It of the motor current is a value with a sign indicating a target value of a d-axis current in motor control using a dq coordinate conversion, and plus/minus of each sign indicates the direction of steering assistance.

The instruction current direction designating unit 29 produces a direction signal Sdir, indicating the direction of steering assistance based upon the given plus/minus sign of the target value It of the motor current, and then gives the produced signal to an convergence correcting unit 27.

A resolver 25 is built in the motor 6 as an angle detector for detecting a rotor position of the motor 6 that is a brushless DC motor for performing steering assistance. A sine wave signal and a cosine wave signal outputted from the resolver 25 are given to a rotor position detecting unit 62 in the ECU 5 and an abnormality detecting unit 63 for detecting abnormality of the resolver 25 in the same. As will be described in detail later, the rotor position detecting unit 62 performs amplitude correction and offset correction for respective sine wave signal and the cosine wave signal given from the resolver 25, and then obtains an electrical angle θre based upon the sine wave signal and the cosine wave signal after the corrections. The electrical angle θre obtained by the rotor position detecting unit 62 is given to a sine wave ROM table 40 and a rotor angular velocity calculating unit 42.

It is to be noted that the rotor position detecting unit 62 has a table for the electrical angle θre corresponded to the sine wave signal value and the cosine wave signal value. By reference to this table, the rotor position detecting unit 62 obtains the electrical angle θre corresponding to the sine wave signal value and the cosine wave after correction.

The sine wave ROM table 40 is a ROM that stores a table making the electrical angle θre and the sine wave signal value correspond with each other. Therefore, the sine wave ROM table 40 outputs the sine wave value sin θre corresponding to the given electrical angle θre, and gives the outputted value to a three phase AC/dq coordinate converting unit 38 and a dq/three phase AC converting unit 32.

The rotor angular velocity calculating unit 42 calculates a rotor angular velocity ωre based upon the given electric angular θre, and gives the calculated rotor angular velocity ωre to an convergence correcting unit 27. To the convergence correcting unit 27, the vehicle speed value Vs and the direction signal Sdir as described above, and further the rotor angular velocity ωre as described above are given. The convergence correcting unit 27 produces a compensation current value ic for securing vehicle convergence based upon the given vehicle speed value Vs, direction signal Sdir and rotor angle velocity ωre. The produced compensation current value ic is given to the adding means 20.

The adding means 20 adds the foregoing compensation current value ic to the target value It of the motor current given from the foregoing torque-current table 33, and gives the addition result as a q-axis current instruction value i*q to subtracting means 24.

A v-phase current detector 54 and a u-phase current detector 56 within the ECU 5 detect current values iv and iu flowing through the v-phase field coil and the u-phase field coil of the motor 6, respectively, and gives the detected results to the three phase AC/dq coordinate converting unit 38.

The three phase AC/dq coordinate converting unit 38 performs dq conversion of the given current values iv and iu into a q-axis current value iq and a d-axis current value id based upon the sine wave value sin θre. The q-axis current value iq and the d-axis current value id after conversion are respectively given to the subtracting means 24 and subtracting means 22.

The subtracting means 24 calculates a deviation eq between the q-axis current instruction value i*q given from the adding means 20 and the q-axis current value iq given from the three phase AC/dq coordinate converting unit 38. The deviation eq as a result of the calculation is given to a q-axis current PI control unit 28.

The subtracting means 22 calculates a deviation ed between the d-axis current instruction value i*d which is "0 (zero)" as being not participating in the torque and the d-axis current value id given from the three phase AC/dq coordinate converting unit 38. The deviation ed as a result of the calculation is given to a d-axis current PI control unit 26.

The q-axis current PI control unit 28 and the d-axis current PI control unit 26 respectively calculate a q-axis voltage Vq and a d-axis voltage Vd for PI control based upon the given deviations eq and ed, and give the calculation results to a limitation processing unit 30.

The limitation processing unit 30 limits the d-axis voltage Vd and the q-axis voltage Vq respectively given from the d-axis current PI control unit 26 and the q-axis current PI control unit 28 such that the current instruction values of the respective phases always become sine waves so as to produce the d-axis voltage instruction value v*d and the q-axis voltage instruction value v*q, and gives the produced values to the dq/three phase AC converting unit 32.

The dq/three phase AC converting unit 32 performs dq inverse conversion (three-phase conversion) of the q-axis voltage instruction value v*q and the d-axis voltage instruction value v*d given from the limitation processing unit 30, to calculate three-phase u-phase voltage instruction value V*u and v-phase voltage instruction value V*v. The u-phase voltage instruction value V*u and the v-phase voltage instruction value V*v as the calculation results are both given to subtracting means 34 and the three-phase PWM unit 50.

The subtracting means 34 calculates a w-phase voltage instruction value V*w based upon the results of the calculation by the dq/three phase AC converting unit 32. Specifically, the subtracting means 34 performs calculation of "V*w=−V*u−V*v", and gives the w-phase voltage instruction value V*w the calculation result to the three-phase PWM unit 50.

The three-phase PWM unit 50 performs pulse width modulation of the respective voltage instruction values V*u, V*v and V*w of the three phases, which are given from the dq/three phase AC converting unit 32 and the subtracting means 34, to produce the respective PWM signals Su, Sv and Sw of the three phases. In this manner, the produced respective voltage signal instruction values V*u, V*v and V*w of the three phases are given from the three-phase PWM unit 50 to the motor drive circuit 52.

The motor drive circuit 52 performs switching between the field coil (not shown) of each phase of the motor 6 and a power source, or a ground terminal by means of the respective PWM signals (pulse signals) Su, Sv and Sw of the three phases given from the three-phase PWM unit 50. Consequently, the motor 6 is PWM driven to output a torque Tm.

It is to be noted that the torque-current table 33, the convergence correcting unit 27, the adding means 20, the instruction current direction designating unit 29, the abnormality detecting unit 63, the rotor position detecting unit 62, the rotor angular velocity calculating unit 42, the sine wave ROM table 40, the three phase AC/dq coordinate converting unit 38, the dq/three phase AC converting unit 32, the subtracting means 24, the subtracting means 22, the q-axis current PI control unit 28, the d-axis current PI control unit 26, the limitation processing unit 30, and the subtracting means 34 are functions realized by the microcomputer 21 which reads a computer program from storing means (not shown) and then executes the program, or the microcomputer 21 reads a predetermined data from storing means (not shown).

Figure 3:
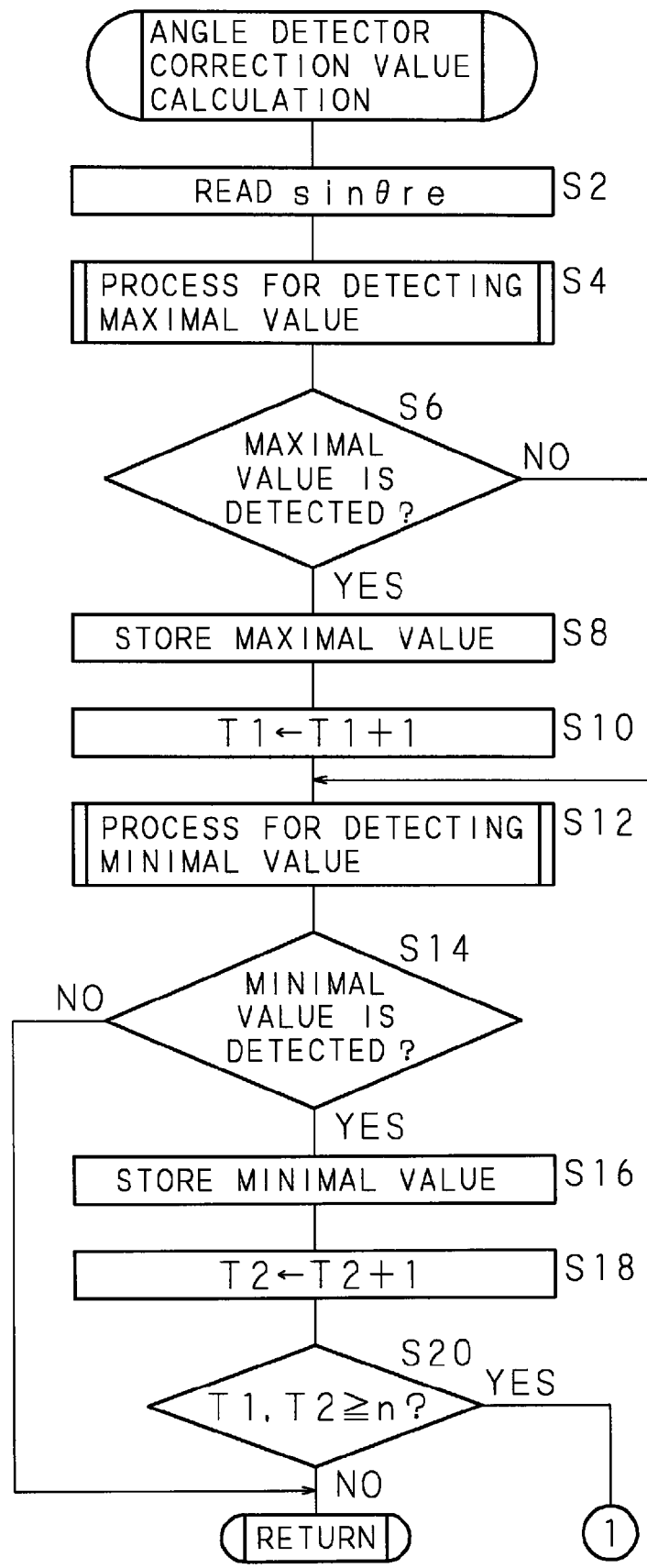
FIG. 3 is a flowchart showing, along with FIG. 4, a procedure for calculating an amplitude correction value and an offset correction value for each of a sine wave signal and a cosine wave signal which were outputted from a resolver (angle detector) in the electric power steering apparatus according to the present invention.
Figure 4:
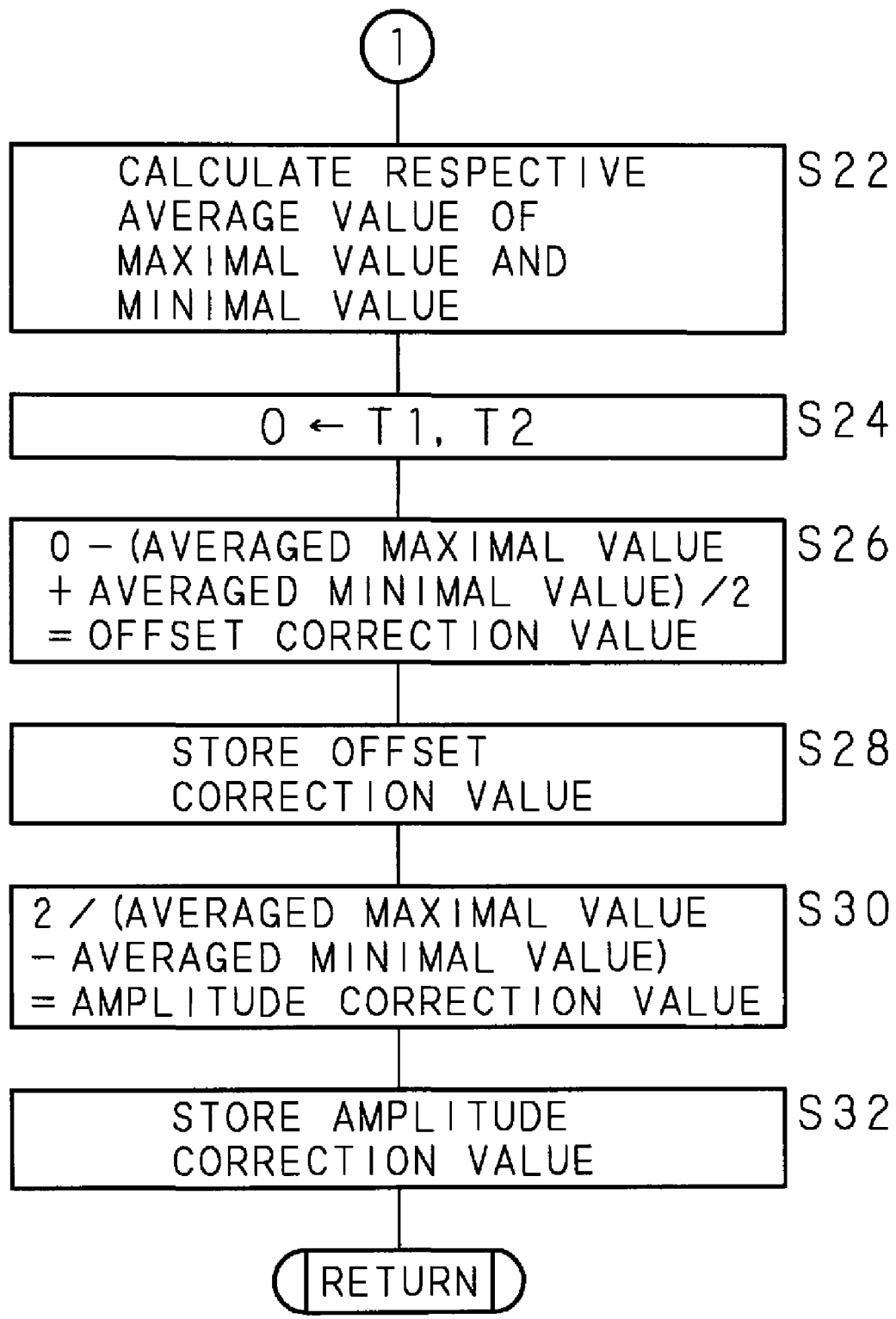
FIG. 4 is a flowchart showing, along with FIG. 3, a procedure for calculating and amplitude correction value and an offset correction value for each of a sine wave signal and a cosine wave signal which were outputted from the resolver (angle detector) in the electric power steering apparatus according to the present invention.

FIG. 3 and FIG. 4 are flowcharts showing procedures in which the rotor position detecting unit 62 calculates an amplifier correction value and an offset correction value of each of the sine wave signal and the cosine wave signal outputted from the resolver 25 (angle detector) in the electric power steering apparatus according to the present invention as described above. For example, in turning-on of an ignition key, at every passage of predetermined time during driving of the vehicle, or the like, each correction value is calculated by the rotor position detecting unit 62 after initialization (zero-clearance) of parameters. It should be noted that the following procedure is realized specifically as a procedure for the rotor position detecting unit 62 performed by execution of a computer program by the microcomputer 21.

Basically, the rotor position detecting unit 62 always reads a sine wave signal sin θre outputted from the resolver 25 (S2). The rotor position detecting unit 62 perform a process for detecting the maximal value of the sine wave signal sin θre by, for example, detecting a value indicating turning of the sine wave signal sin θre from an increase to a decrease (S4).

When the maximal value of the sine wave signal sin θre is detected (YES in S6), the rotor position detecting unit 62 stores the detected maximal value (S8), and increments a parameter T1 by one (S10). It is to be noted that the parameter T1 is initially cleared to zero as described above. Further, the value of the parameter T1 represents the number of detections of the maximal value of the sine wave signal sin θre.

Further, the rotor position detecting unit 62 perform a process for detecting the minimal value of the sine wave signal sin θre by detecting, for example, a value indicating turning of the sine wave signal sin θre from the decrease to the increase (S12). When the minimal value of the sine wave signal sin θre is detected (YES in S14), the rotor position detecting unit 62 stores the detected minimal value (S16), and increments a parameter T2 by one (S18). It is to be noted that a parameter T2 is also initially cleared to zero as described above. Further, the value of the parameter T2 represents the number of detection of the minimal value of the sine wave signal sin θre.

In addition, when the maximum value of the sine wave signal sin θre is not detected (NO in S6), the rotor position detecting unit 62 directly shifts the procedure to a process for detecting the minimal value of the sine wave signal sin θre in Step S12. Further, when the minimal value is not detected (NO in S14), the rotor position detecting unit 62 returns the procedure as it is.

The rotor position detecting unit 62 increments the parameter T2 by one (S18), and thereafter judges whether or not the parameters T1 and T2 are both not less than n (n is a positive integer number) (S20). When the result of this judgment is negative, (NO in S20), the rotor position detecting unit 62 returns the procedure as it is. Therefore, since the judgment result in Step S20 is "NO" when the minimal value of the sine wave signal sin θre is detected while the maximal value of the same is not detected, the rotor position detecting unit 62 returns the procedure as it is also in this case.

When both of the parameters T1 and T2 are judged to be not less than n (YES in S20), the rotor position detecting unit 62 divides the maximal value and the minimal value stored in Steps S8 and S16 by the parameters T1 and T2, respectively, to calculates average values (S22). Thereafter, the parameters T1 and T2 are initialized (cleared to zero) (S24).

Next, using the averaged maximal value and the averaged minimal value calculated in Step S22, the rotor position detecting unit 62 performs a calculation of "Offset correction value=0−(Averaged maximal value+Averaged minimal value)/2" (S26), and stores the "offset correction value" as the calculation result (S28). It is to be noted that offset correction as described above is carried out with respect to a neutral point. Subsequently, the rotor position detecting unit 62 performs a calculation of "Amplitude correction value=2/(Averaged maximal value−Averaged minimal value)" (S30), and stores the "amplitude correction value" as the calculation result (S32). Thereafter, the rotor position detecting unit 62 returns the procedure.

After storing the offset correction value in Step S28 and storing the amplitude correction value in Step S32, the rotor position detecting unit 62 corrects the read sine wave signal sin θre by means of the stored offset correction value and amplitude correction value until those stored values are updated.

Specifically, the rotor position detecting unit 62 performs offset correction by adding the offset correction value to the read sine wave signal sin θre, and performs amplitude correction by multiplying the sine wave signal sin θre subjected to the offset correction by the amplitude correction value.

It is to be noted that, although the foregoing description is given to the procedure regarding the sine wave signal sin θre performed by the rotor position detecting unit 62, a similar procedure is performed by the rotor position detecting unit 62 as for a cosine wave signal cos θre. Namely, the rotor position detecting unit 62 simultaneously performs operations for correcting both of the sine wave signal sin θre and the cosine wave signal cos θre.

Figure 5:
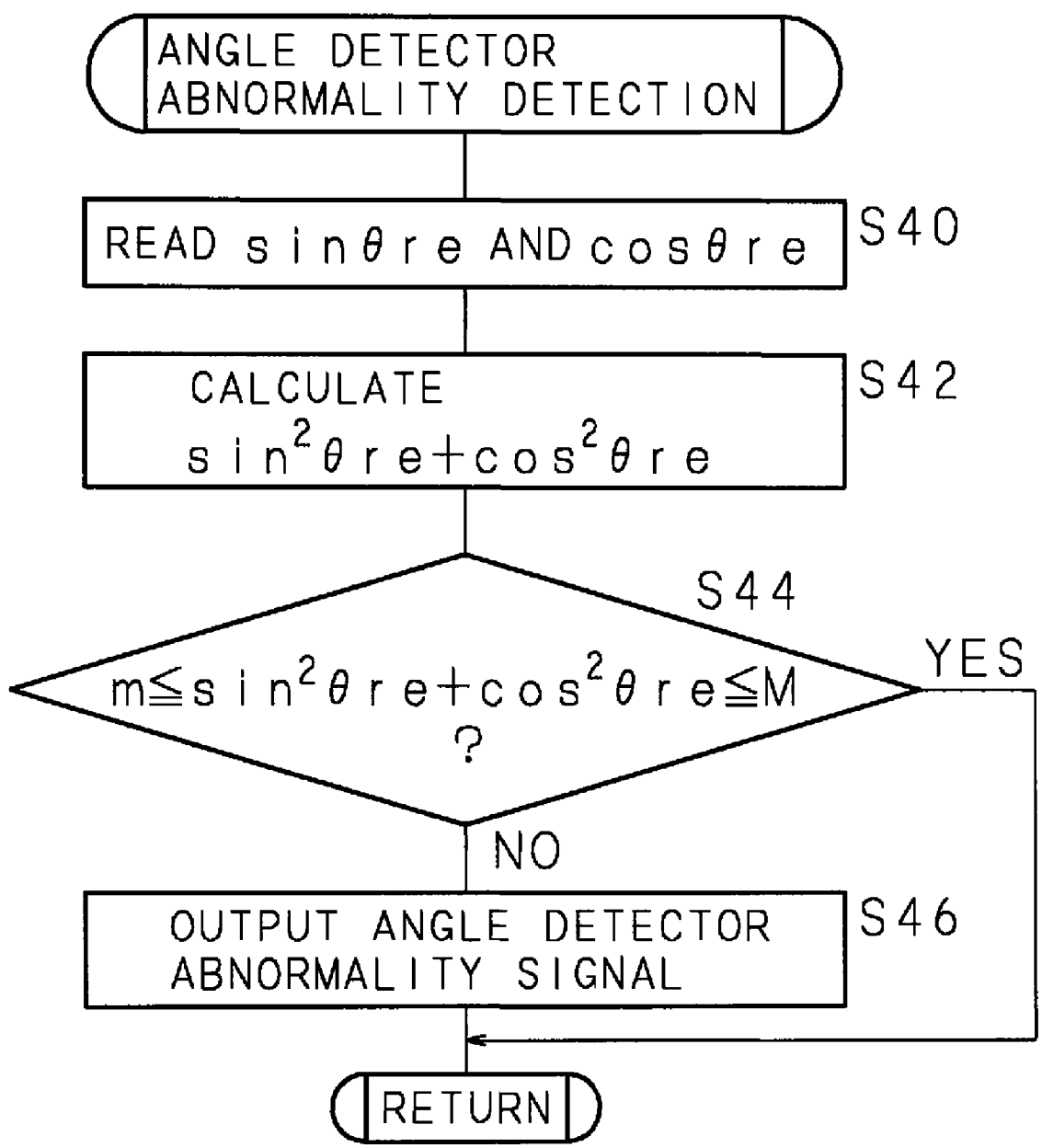
FIG. 5 is a flowchart showing a detecting operation in a case where abnormality (breakdown) has occurred in the resolver (angle detector) of the electric power steering apparatus according to the present invention.

Next, with reference to the flowchart of FIG. 5 showing the procedure performed by the microcomputer 21 of the ECU 5, a description is given to a detecting operation in a case where abnormality (breakdown) has occurred in the resolver 25 (angle detector) as the angle detector of the electric power steering apparatus according to the present invention. It should be noted that the following procedure is realized specifically as a procedure for the abnormality detecting unit 63 performed by execution of a computer program by the microcomputer 21.

The abnormality detecting unit 63 basically always reads a sine wave signal sin θre and a cosine wave signal cos θre outputted from the resolver 25 (S40), and always performs a calculation of "$\sin^2\theta re + \cos^2\theta re$" (S42). The abnormality detecting unit 63 then judges whether or not the calculation result of "$\sin^2\theta re + \cos^2\theta re$" falls within a predetermined range of m to M (S44). When the judgment result in Step S44 falls within the range of m to M (YES in S44), the abnormality detecting unit 63 returns the procedure as it is.

On the other hand, when the judgment result in Step S44 does not fall within the predetermined range of m to M (NO in S44), the abnormality detecting unit 63 determines that abnormality has occurred in the angle detector (resolver 25), and outputs an angle detector abnormality signal which indicates occurrence of abnormality in the resolver (angle detector) 25 (S46). Thereafter, the abnormality detecting unit 63 returns the procedure.

When the abnormality detecting unit 63 outputs the angle detector abnormality signal, the ECU 5, for example, inhibits drive control of the motor 6 by the motor drive circuit 52, to bring the motor 6 into the state of being freely rotatable in concert with rotation of the steering wheel 1.

Here, a normal range of the foregoing predetermined range of m to M is determined shown in FIG. 6B with an error and a tolerance taken into consideration with respect to the theoretic value, based upon a size of a vector whose components are (sin θre, cos θre) shown in FIG. 6A.

Figure 7A:
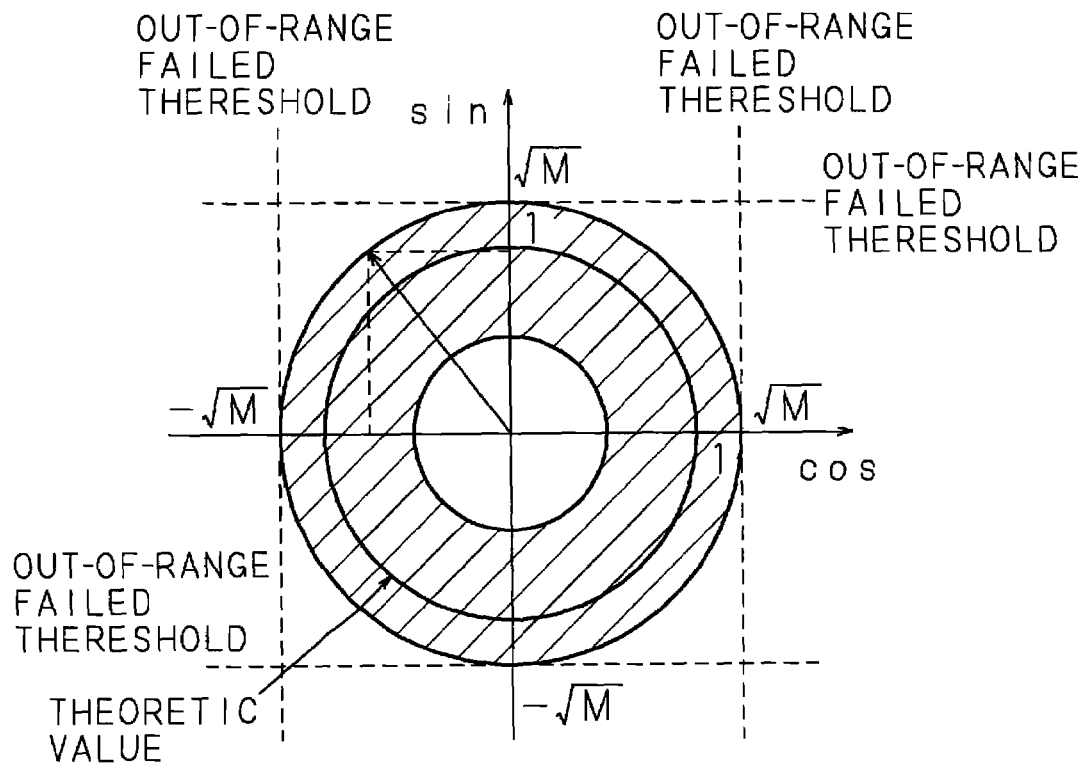
FIG. 7A and FIG. 7B are explanatory views for explaining an operation of detecting abnormality in the resolver (angle detector) of the electric power steering apparatus according to the present invention.

Although sin θre and cos θre should, in theory, fall within the range of −1 to +1, as shown in FIG. 7A, the upper limit value M of the predetermined range of m to M is determined based on an out-of-range failed threshold $\pm\sqrt{M}$ as the maximum value of the error range of the resolver 25.

Figure 7B:
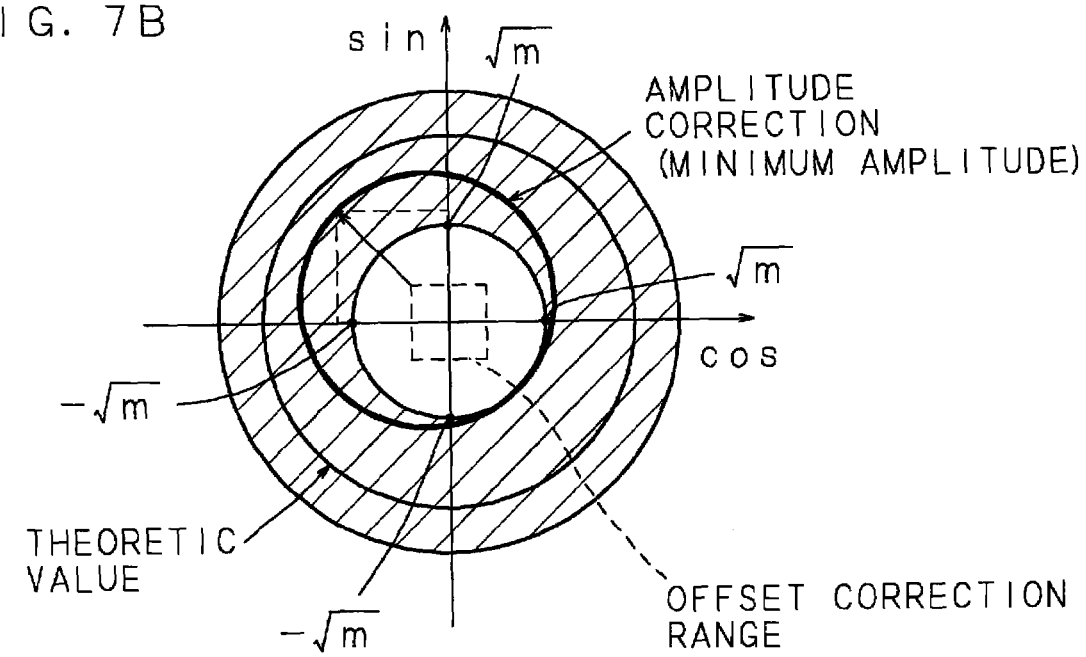

As shown in FIG. 7B, the lower limit value m of the predetermined range of m to M is determined as the minimum value among values which can be taken by "$\sin^2\theta re + \cos^2\theta re$" in the range correctable by the foregoing respective amplitude correction and offset correction of sin θre and cos θre as the output of the resolver 25. For example, when the minimum amplitude value is correctable, the minimum value m is determined assuming the case of offsetting by a value corresponding to the maximum value within the offset correctable range. It should be noted that sin θre and cos θre here are values before the amplitude correction and the offset correction are made.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

The invention claimed is:

1. An electric power steering apparatus which comprises: an angle detector for outputting a sine wave signal and a cosine wave signal corresponding to a rotor position of a brushless DC motor for assisting steering; a torque detector for detecting a steering torque applied to a steering member; and an abnormality detecting unit for detecting occurrence of abnormality in said angle detector; and which drives said brushless DC motor to assist steering based upon the sine wave signal and the cosine wave signal outputted from said angle detector and the steering torque detected by said torque detector, wherein said abnormality detecting unit includes:
  sine wave signal squaring means for squaring the sine wave signal detected by said angle detector;
  cosine wave signal squaring means for squaring the cosine wave signal detected by said angle detector;
  adding means for adding the sine wave signal squared by said sine wave signal squaring means to the cosine wave signal squared by said cosine wave signal squaring means;
  judging means for judging whether or not the addition result by said adding means falls within a predetermined range; and
  abnormality detecting means for detecting occurrence of abnormality in said angle detector when said judging means judges that the addition result does not fall within the predetermined range.

2. The electric power steering apparatus as set forth in claim 1, further comprising:
  sine wave offset correcting means for correcting an offset of the sine wave signal detected by said angle detector with respect to a neutral point;
  cosine wave offset correcting means for correcting an offset of the cosine wave signal detected by said angle detector with respect to a neutral point;
  sine wave amplitude correcting means for correcting an amplitude value of the sine wave signal detected by said angle detector; and
  cosine wave amplitude correcting means for correcting an amplitude value of the cosine wave signal detected by said angle detector;
  wherein a lower limit of said predetermined range is determined based upon the minimum value out of addition results obtained by said adding means within a range where the sine wave signal and the cosine wave signal are correctable by both of said offset correcting means and both of said amplitude correcting means.

3. The electric power steering apparatus as set forth in claim 1, wherein the upper limit of the predetermined range is determined based upon respective error ranges of the sine wave signal and the cosine wave signal.

4. The electric power steering apparatus as set forth in claim 3, further comprising:
  sine wave offset correcting means for correcting an offset of the sine wave signal detected by said angle detector with respect to a neutral point;
  cosine wave offset correcting means for correcting an offset of the cosine wave signal detected by said angle detector with respect to a neutral point;
  sine wave amplitude correcting means for correcting an amplitude value of the sine wave signal detected by said angle detector; and
  cosine wave amplitude correcting means for correcting an amplitude value of the cosine wave signal detected by said angle detector;
  wherein a lower limit of said predetermined range is determined based upon the minimum value out of addition results obtained by said adding means within a range where the sine wave signal and the cosine wave signal are correctable by both of said offset correcting means and both of said amplitude correcting means.

5. An electric power steering apparatus comprising: an angle detector for outputting a sine wave signal and a cosine wave signal corresponding to a rotor position of a brushless DC motor for assisting steering; a torque detector for detecting a steering torque applied to a steering member; and a controller capable of performing operation of driving said brushless DC motor to assist steering based upon the sine wave signal and the cosine wave signal outputted from said angle detector and the steering torque detected by said torque detector; wherein
  said controller further capable of performing the following operations of:
  squaring the sine wave signal detected by said angle detector;
  squaring the cosine wave signal detected by said angle detector;
  adding the squared sine wave signal to the squared cosine wave signal;
  judging whether or not the addition result falls within a predetermined range; and
  detecting occurrence of abnormality in said angle detector when the addition result does not fall within the predetermined range.

6. The electric power steering apparatus as set forth in claim 5, wherein said controller further capable of performing the following operations of:
  correcting an offset of the sine wave signal detected by said angle detector with respect to a neutral point;
  correcting an offset of the cosine wave signal detected by said angle detector with respect to a neutral point;
  correcting an amplitude value of the sine wave signal detected by said angle detector;
  correcting an amplitude value of the cosine wave signal detected by said angle detector; and
  determining a lower limit of said predetermined range based upon the minimum value out of addition results obtained by said adding operation within a range where the sine wave signal and the cosine wave signal are correctable by both of said offset correcting operations and both of said amplitude correcting operations.

7. The electric power steering apparatus as set forth in claim 5, wherein said controller further capable of performing the following operation of determining the upper limit of the predetermined range based upon respective error ranges of the sine wave signal and the cosine wave signal.

8. The electric power steering apparatus as set forth in claim 7, wherein said controller further capable of performing the following operations of:
  correcting an offset of the sine wave signal detected by said angle detector with respect to a neutral point;
  correcting an offset of the cosine wave signal detected by said angle detector with respect to a neutral point;
  correcting an amplitude value of the sine wave signal detected by said angle detector;
  correcting an amplitude value of the cosine wave signal detected by said angle detector; and
  determining a lower limit of said predetermined range based upon the minimum value out of addition results obtained by said adding operation within a range where the sine wave signal and the cosine wave signal are correctable by both of said offset correcting operations and both of said amplitude correcting operations.

9. A method for detecting abnormality of an angle detector of an electric power steering apparatus which comprises: an angle detector for outputting a sine wave signal and a cosine wave signal corresponding to a rotor position of a brushless DC motor for assisting steering; a torque detector for detecting a steering torque applied to a steering member; and an abnormality detecting unit for detecting occurrence of abnormality in said angle detector; and which drives said brushless DC motor to assist steering based upon the sine wave signal and the cosine wave signal outputted from said angle detector and the steering torque detected by said torque detector, comprising the steps of:

making said abnormality detecting unit square the sine wave signal outputted by said angle detector;

making said abnormality detecting unit square the cosine wave signal outputted by said angle detector;

making said abnormality detecting unit add the squared sine wave signal to the squared cosine wave signal;

making said abnormality detecting unit judge whether or not the addition result falls within a predetermined range; and making said abnormality detecting unit determine that abnormality occurs in said angle detector when the addition result does not fall within the predetermined range.

10. The method as set forth in claim 9, wherein said power steering apparatus further comprising a rotor position detecting unit for detecting a rotor position of said brushless DC motor based on the sine wave signal and the cosine wave signal outputted by said angle detector, said method further comprising the steps of:

making said rotor position detecting unit correct an offset of the sine wave signal outputted by said angle detector with respect to a neutral point;

making said rotor position detecting unit correct an offset of the cosine wave signal outputted by said angle detector with respect to a neutral point;

making said rotor position detecting unit correct an amplitude value of the sine wave signal; and making said rotor position detecting unit correct an amplitude value of the cosine wave signal;

wherein a lower limit of said predetermined range is determined based upon the minimum value out of addition results obtained by said adding step within a range where the sine wave signal and the cosine wave signal are correctable by both of said offset correcting step and both of said amplitude correcting step.

11. The method as set forth in claim 9, wherein the upper limit of the predetermined range is determined based upon respective error ranges of the sine wave signal and the cosine wave signal.

12. The method as set forth in claim 11, wherein said power steering apparatus further comprising a rotor position detecting unit for detecting a rotor position of said brushless DC motor based on the sine wave signal and the cosine wave signal outputted by said angle detector, said method further comprising the steps of:

making said rotor position detecting unit correct an offset of the sine wave signal outputted by said angle detector with respect to a neutral point;

making said rotor position detecting unit correct an offset of the cosine wave signal outputted by said angle detector with respect to a neutral point;

making said rotor position detecting unit correct an amplitude value of the sine wave signal; and making said rotor position detecting unit correct an amplitude value of the cosine wave signal;

wherein a lower limit of said predetermined range is determined based upon the minimum value out of addition results obtained by said adding step within a range where the sine wave signal and the cosine wave signal are correctable by both of said offset correcting step and both of said amplitude correcting step.

* * * * *